US008353039B2

(12) United States Patent
Cooley et al.

(10) Patent No.: US 8,353,039 B2
(45) Date of Patent: Jan. 8, 2013

(54) METHOD AND APPARATUS FOR PROCESSING A MULTI-STEP AUTHENTICATION SEQUENCE

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 951 days.

(21) Appl. No.: 12/002,706

(22) Filed: Dec. 18, 2007

(65) Prior Publication Data

US 2009/0158399 A1 Jun. 18, 2009

(51) Int. Cl.
*H04L 29/06* (2006.01)
(52) U.S. Cl. ......................................................... 726/24
(58) Field of Classification Search ........................ 726/4
See application file for complete search history.

(56) References Cited

U.S. PATENT DOCUMENTS

| | | | | |
|---|---|---|---|---|
| 5,818,936 | A * | 10/1998 | Mashayekhi | 713/167 |
| 6,243,480 | B1 * | 6/2001 | Zhao et al. | 382/100 |
| 6,535,912 | B1 * | 3/2003 | Anupam et al. | 709/217 |
| 7,231,517 | B1 * | 6/2007 | Mashayekhi | 713/167 |
| 2004/0158746 | A1 * | 8/2004 | Hu et al. | 713/202 |
| 2005/0071642 | A1 * | 3/2005 | Moghe et al. | 713/182 |
| 2005/0177731 | A1 * | 8/2005 | Torres et al. | 713/182 |
| 2006/0026435 | A1 * | 2/2006 | Wu et al. | 713/182 |
| 2006/0048214 | A1 * | 3/2006 | Pennington et al. | 726/5 |
| 2006/0179404 | A1 | 8/2006 | Yolleck et al. | |
| 2007/0186103 | A1 * | 8/2007 | Randle et al. | 713/168 |

FOREIGN PATENT DOCUMENTS

| | | |
|---|---|---|
| JP | 2004295252 A | 10/2004 |
| KR | 10-2001-0044667 A | 6/2001 |

OTHER PUBLICATIONS

International Search Report and Written Opinion mailed Jun. 30, 2009 for PCT Application No. PCT/US2008/086074.
International Preliminary Report on Patentability and Written Opinion dated Jul. 1, 2010 for PCT Application No. PCT/US2008/086074.
Extended European Search Report mailed on Sep. 29, 2011, for European Application No. 08860895.5 filed Dec. 9, 2008, 8 pages.
"Introducing the first password manager to support sequential login schemes," Retrieved from the internet: URL:http://www.protecteer.com/news/news.asp?newsid=9 (Nov. 9, 2006).

* cited by examiner

*Primary Examiner* — Michael S McNally
(74) *Attorney, Agent, or Firm* — Wilmer Cutler Pickering Hale and Dorr LLP

(57) ABSTRACT

A method of automating an authentication sequence for accessing a computer resource comprising processing form information associated with the authentication sequence, wherein the authentication sequence comprises a plurality of queries associated with a plurality of web pages; and communicating a response to a portion of the authentication sequence using form information that corresponds to a query upon recognition of indicia of the portion of the plurality of web pages where the portion comprises the query.

19 Claims, 4 Drawing Sheets

METHOD AND APPARATUS FOR PROCESSING A MULTI-STEP AUTHENTICATION SEQUENCE

BACKGROUND OF THE INVENTION

1. Field of the Invention

Embodiments of the present invention generally relate to network computing and, more particularly, to a method and apparatus for processing a multi-step authentication sequence that includes a plurality of queries distributed over a plurality of web pages.

2. Description of the Related Art

Many transactions are conducted with the assistance of identification tools, such as passwords, signatures, social security numbers (SSN), driver license numbers, retinal scans, bio-scans and the like. Such transactions include financial, such as banking (e.g., withdrawing, transferring and depositing money through an ATM), commercial sales (e.g., using a credit or debit card to purchase goods and services) and the like; or personal such as social networking sites, blog subscriptions and the like. The above transactions usually require a login name and a password, but may require other identification information.

With recent increases in financial transaction and personal security, new solutions have been created to provide a more secure user login mechanism. Such solutions changed the typical single authentication step, which usually contained only a username and password field, to a multi-step authentication sequence disseminated across multiple web pages. In a typical multi-step authentication sequence the first page may ask for a username, the second page may display a validation image and/or a phrase and a challenge question (e.g., "What city where you born in?"), and the third page may ask for a password. As such, software designed to auto-answer the single authentication step are unable to auto-answer the multi-step authentication sequence.

Accordingly, there exists the need for a method and apparatus for automatically answering multi-step authentication sequences.

SUMMARY OF THE INVENTION

Embodiments of the present invention generally relate to a method and apparatus for processing a multi-step authentication sequence for accessing a computer resource. In one embodiment, a method comprising processing form information associated with the authentication sequence, wherein the authentication sequence comprises a plurality of queries associated with a plurality of web pages, and communicating a response to a portion of the authentication sequence using form information that corresponds to a query upon recognition of indicia of the portion of the plurality of web pages where the portion comprises the query.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one" unless otherwise mentioned.

DETAILED DESCRIPTION

Figure 1:
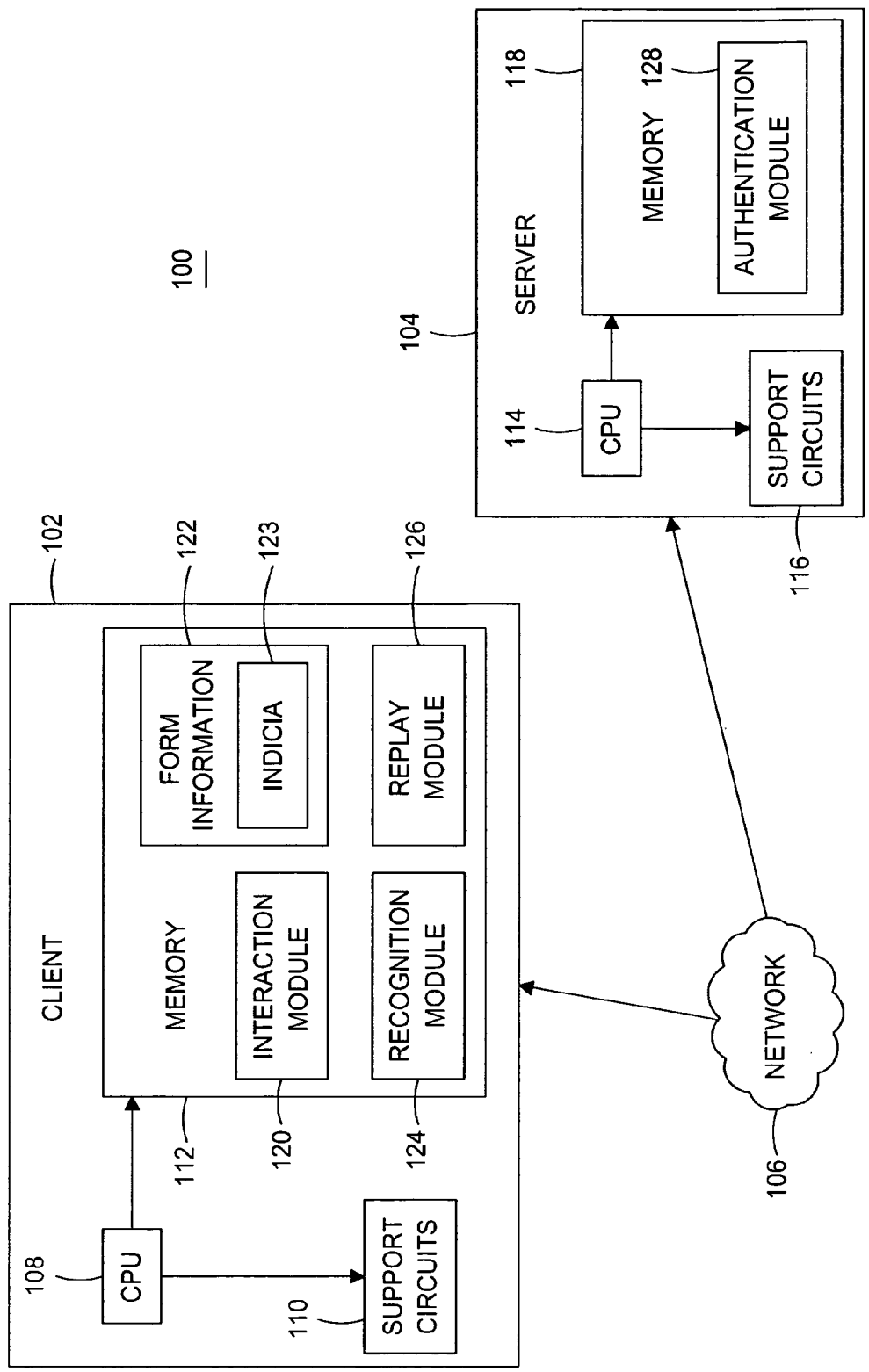
FIG. 1 is a block diagram of a system according to various embodiments of the present invention.

FIG. 1 is a block diagram of a system 100 according to various embodiments of the present invention. The system 100 comprises a client computer 102 and a server 104, coupled to each other through a network 106.

The network 106 comprises a communication system that connects a computer system by wire, cable, fiber optic, and/or wireless links facilitated by various types of well-known network elements, such as hubs, switches, routers, and the like. The network 106 may employ various well-known protocols to communication information amongst the network resources. For example, the network 106 may be part of the Internet or intranet using various communications infrastructure such as Ethernet, WiFi, WiMax, General Packet Radio Service (GPRS), and the like.

The server 104 is configured to provide services (e.g., web, data, processing) to the client 102. The server 104 comprises a CPU 114, support circuits 116, and a memory 118. The CPU 114 may be one or more of any commercially available microprocessors or microcontrollers. The support circuits 116 are used in support of the operation of the CPU 114. The support circuits 116 include, for example, cache, input/output circuits, communications circuits, clock circuits, power supplies, system bus, PCI bus and the like.

The memory 118 may comprise random access memory, read only memory, removable storage, optical storage and the like. Various types of software modules and information are resident within the memory 118. In at least one embodiment of the present invention, an authentication module 128 is stored in memory 118. In one or more embodiments, the authentication module 128 performs a multi-step authentication sequence that generally comprises a plurality of queries spread amongst a plurality of web sites. The authentication module may include any combination of validation images, challenge questions, login/password information as well as any other information or modules required to present the plurality of web pages to the client 102 (e.g., documents in markup or scripting languages such as HTML, XML, PHP and the like).

The client computer 102 comprises a CPU 108, various support circuits 110, and a memory 112. The CPU 108 may be one or more of any commercially available microprocessors or microcontrollers. The various support circuits 110 are used in support of the operation of the CPU 108. The support circuits 110 include, for example, cache, input/output circuits, communications circuits, clock circuits, power supplies, system bus, PCI bus and the like. Those skilled in the art will appreciate that the hardware depicted in the FIG. 1 may vary from one computer system to another. For example, other peripheral devices, such as optical disk drives, graphics card, data storage devices, various other input devices and the like, may also be used in addition to or in place of the hardware depicted.

The memory 112 may comprise random access memory, read only memory, removable storage, optical storage and the like. In at least one embodiment of the invention. Various types of software modules and information are resident within the memory 112. The memory 112 includes an interaction module 120, form information 122, a recognition module 124, and a replay module 126. The interaction module 120, the recognition module 124, and the replay module 126 are sets of instructions executed by CPU 108 to perform a method in accordance with at least one embodiment of the present invention.

The interaction module 120 may be a stand alone software program or may be a portion of a larger program such as an internet web browser (e.g., a plug-in application). In accordance with various embodiments of present invention, the interaction module 120 monitors user interaction with web forms (e.g., the plurality of queries of the multi-step authentication sequence) and records form fields (e.g., challenge questions, login, password, SSN and other queries), inputs (e.g., answers) and the like. Then, the interaction module 120 stores such information as form information 122 in the memory 112.

The multi-step authentication sequence 128 is recognized by identifying web pages that contain password fields. If a password field is found on a first web page, and there is no username field on that same page, then the interaction module searches the form information 122 recently completed form data on a second web page associated with the first web page. If so, then a multi-step authentication sequence has been recognized. The interaction module 120 gathers prior forms that were recently completed on a same or similar URL associated with the first web page, and stores the form data (e.g., form fields, input values and other site information) including as form information 122. The interaction module 120 also stores various indicia 123 of the plurality web pages (e.g., hosting URL, target URL, form field names, layout information of the plurality of web pages and the like) in the form information 122 for use by the recognition module 124.

In one or more embodiments, the form information 122 would only need to store no more than the last 5 to 10 web forms encountered. However, the storage capacity of the form information 122 would need to be flexible to accommodate future changes to multi-step authentication sequences. The form information 122 also includes interactions which have been determined to be associated with the multi-step authentication sequence that the user desires to remember.

Further and in accordance with one or more embodiments of the present invention, the recognition module 124 is employed to identify the various indicia 127 (i.e., hosting URL, target URL, form field names and the like) of the commencement or continuation of a previously recorded multi-step authentication sequence. The various indicia 123 may be identified by both exact and fuzzy (inexact) match indicators (e.g., hosting/target URLs, form field names, or page text (visible to the user)). When a match is found, the replay module 126 is notified. In one embodiment, the various indicia 127 used to identify the previously recorded multi-step authentication sequence are communicated to the replay module 126.

Additionally, the replay module 126 operates based on notifications from the recognition module 124. When notified, the replay module 126 module pulls the appropriate portion of the form information 122 for the currently active step of the multi-step authentication sequences and pushes (i.e., click the same submit, or similar, button that the user had originally clicked) the portion to the browser. The "pushing" moves the multi-step authentication sequence to the next step by correctly answering one of the plurality of the queries. Once on the next step, the recognition module 124 recognizes the next step and calls the replay module 126, which repeats the above operations on the next step.

Optionally, it should be noted that when a validation image is utilized in the multi-step authentication sequence, the recognition module 124 may verify the validation image displayed to the user before notifying the replay module 126. Consequently, if the recognition module 124 determines a mismatch between the recorded validation image and the displayed validation image, then processing of the multi-step authentication sequence is terminated due to a high likelihood of a phishing or pharming web page.

Similarly, if the challenge question changes from the previously recorded multi-step authentication sequence (e.g., which may be detected by the change in visible user text near the input field), the replay module 126 does not auto-respond to the challenge question. Instead, the user fills in the answer and clicks next, at which point the replay module 126 would record the user's answer in the form information 122 and any associated indicia in the various indicia 123 within the form information 122. Further, once the user manually answers the challenge question, the recognition module 124 processes the next step in the multi-step authentication sequence.

Figure 2:
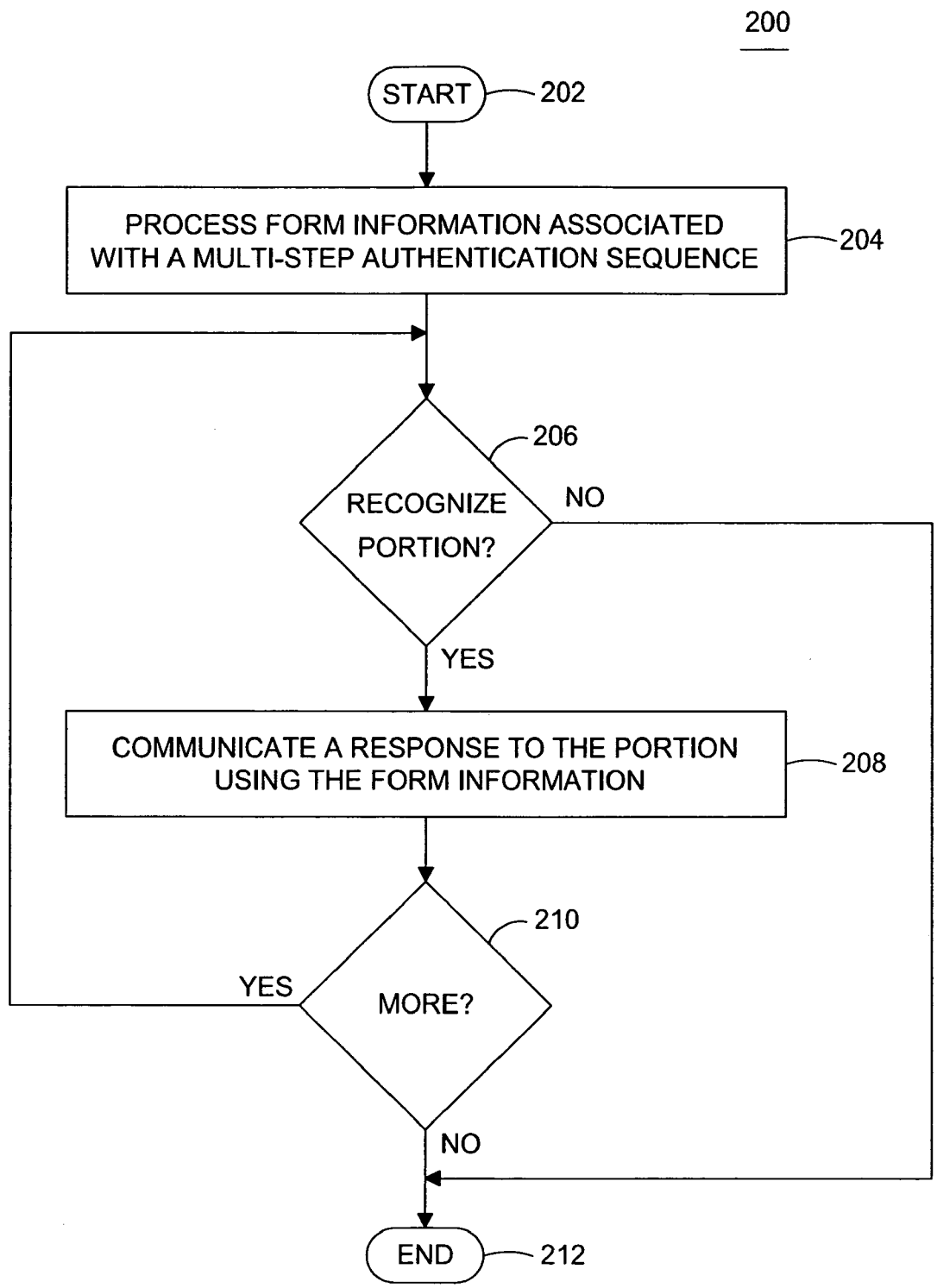
FIG. 2 is a flow diagram of a method for automating answering a multi-step authentication sequence according to various embodiments of the present invention.

FIG. 2 is a flow diagram of a method 200 for automatically answering a multi-step authentication sequence. The method 200 begins at step 202, and at step 204, form information that may be used in completing the multi-step authentication sequence is processed. In step 206, it is determined whether a portion of a previously recorded multi-step authentication sequence is recognized. If the portion is not recognized, option "No", the method 200 proceeds to step 212. If the portion is recognized, option "Yes", the method 200 proceeds to step 208 where a response is communicated using the form information that corresponds to the portion. At step 210, a determination is made as to whether there are any more steps in the multi-step authentication sequence. If there are more steps, the method 200 returns to step 206 and repeats the recognition determination for the next step in the multi-step authentication sequence. If there are no more steps, the method 200 proceeds to step 212. The method ends at step 212.

Figure 3:
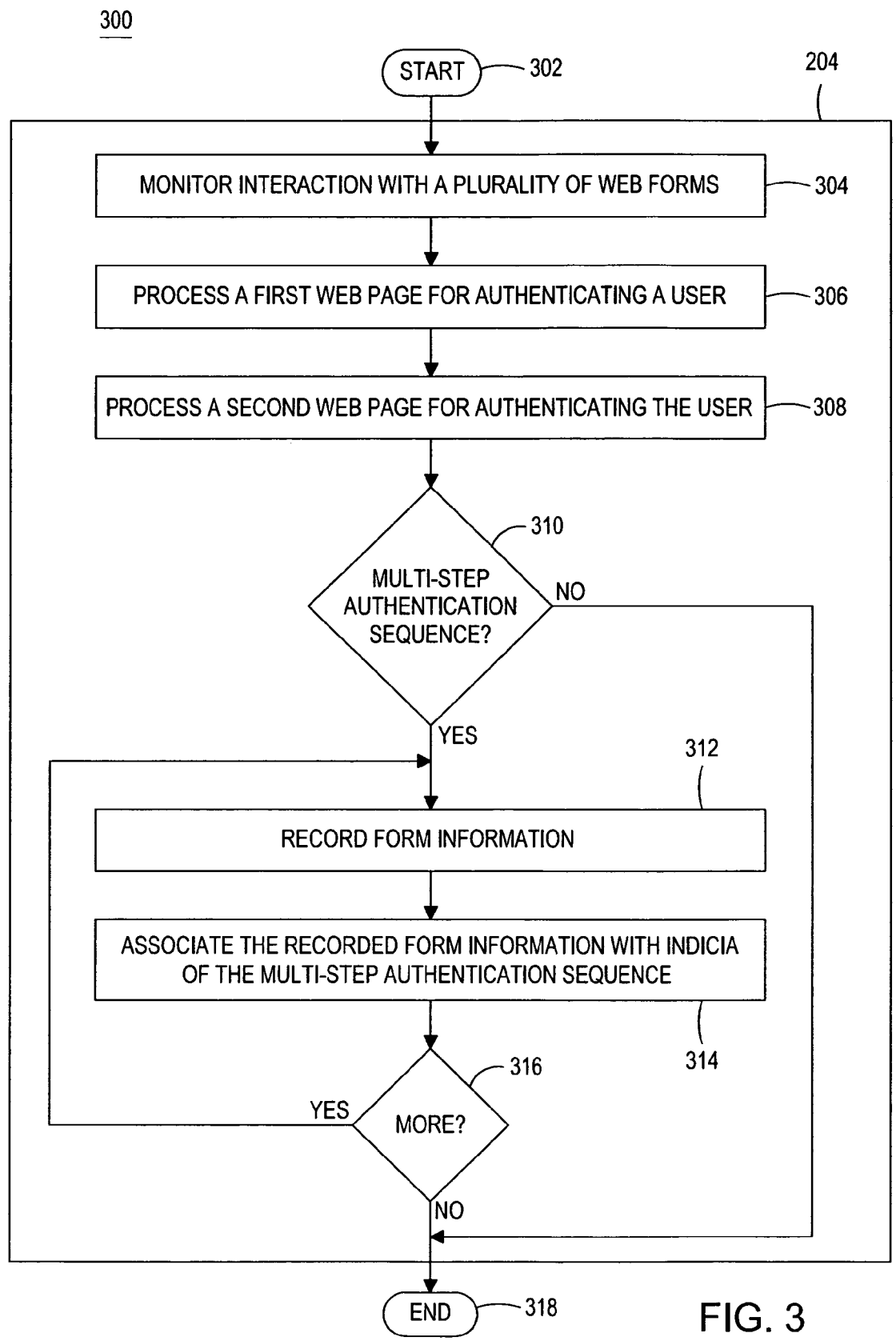
FIG. 3 is a flow diagram of a method for recording form information associated with a multi-step authentication sequence according to various embodiments of the present invention.

FIG. 3 is a flow diagram of a method 300 for recording form information associated with a multi-step authentication sequence in accordance with at least one embodiment of the present invention. The method 300 begins at step 302, and in step 304, user interaction with a plurality of web forms is monitored. At step 306, a first web page is processed (i.e., fields, inputs, etc. are recorded from the web page). At step 308, a second web page is similarly processed. Then, at step 310, it is determined whether the first and second web pages form part of the multi-step authentication sequence. As previously explained, the multi-step authentication sequence is recognized by identifying web pages that contain password fields. If a password field is found on the first web page, and there is no username field on that same page, the form information is examined to determine if the user had recently filled-in form data on any other web pages (e.g., the second web page) on a site associated the first web page. In another embodiment, if the first web page comprises the password field and the second web page is associated with the same site as the first web page and comprises another query for accessing a computer resource, then the first web page and the second web page most likely form part of the multi-step authentication sequence.

If so, then the multi-step authentication sequence has been recognized. If the first and second web pages are not part of the multi-step authentication sequence, option "No", the method proceeds to step 318. If the web pages form a portion of the multi-step authentication sequence, option "Yes", then in step 312 form information associated with the first and second web pages are recorded. At step 314, the recorded form information is associated with indicia of the multi-step authentication sequence (e.g., hosting/target URLs, form field names, or page text (visible to the user)). At step 316, a determination is made as to whether one or more web pages are included within the remaining portion of the multi-step authentication sequence. If there are one or more web pages, the method 300 returns to step 312 where form information for the next web page is recorded and such form information is associated with indicia of the next web page in the multi-step authentication sequence. If there are no more web pages in the multi-step authentication sequence, the method 300 proceeds to step 318. At step 318, the method 300 ends.

Figure 4:
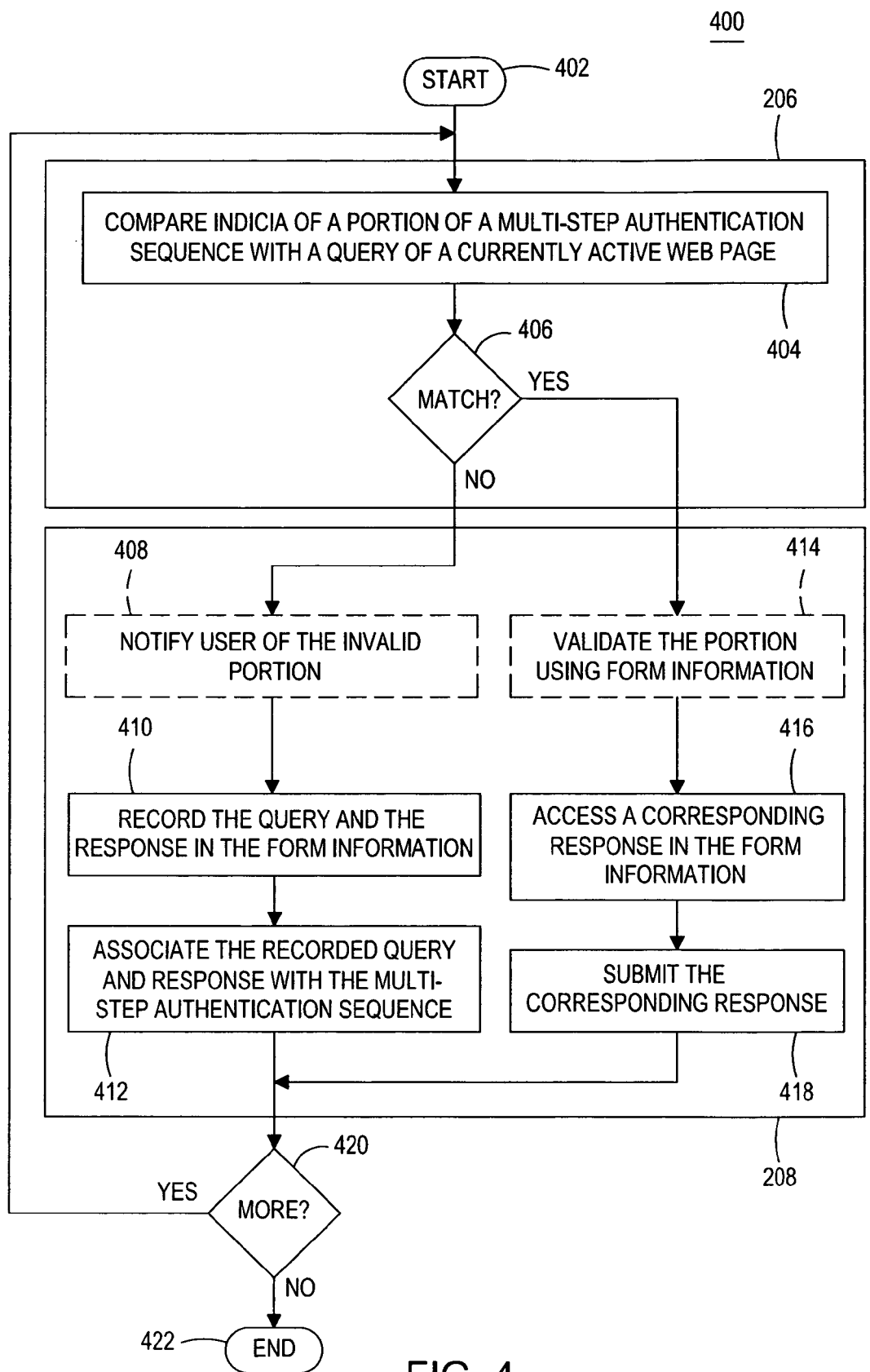
FIG. 4 is a flow diagram of a method for automating a multi-step authentication sequence for accessing a computer resource according to various embodiments of the present invention.

FIG. 4 is a flow diagram of a method for automating a multi-step authentication sequence for accessing a computer resource in accordance with various embodiments of the present invention. The method begins at step 402 and proceeds to step 404, where indicia of a portion of the multi-step authentication sequence with a query of a currently active web page. At step 406, the currently active page is examined to determine if indicia present thereupon matches previously recorded indicia of the multi-step authentication sequence.

If there is no match, option "No", the method 400 proceeds to step 408. At optional step 408, a user is notified of an invalid portion of the multi-step authentication sequence (e.g., a phishing site using an incorrect validation image). At step 410, the query and user-entered response are recorded in the form information. At step 412, the query and the response are associated with (indicia of) the multi-step authentication sequence. Then, the method 400 proceeds to step 420 described below.

If there is a match, option "Yes", the method 400 proceeds to step 414. At optional step 414, the portion (e.g., validation image) is validated if there is a match between the indicia of the currently active web page and the portion of the multi-step authentication sequence, as explained above. At step 416, a corresponding response in the form information is accessed. At step 418, the corresponding response to the query is submitted. At step 420, a determination is made as to whether there are more queries in the multi-step authentication sequence. If there are more queries, the method 400 returns to step 404. If there are no more queries, the method 400 proceeds to step 422. The method ends at step 422.

While the foregoing is directed to embodiments of the present invention, other and further embodiments of the invention may be devised without departing from the basic scope thereof, and the scope thereof is determined by the claims that follow.

The invention claimed is:

1. A method of automating a multi-step authentication sequence for accessing a computer resource, comprising: processing form information associated with the multi-step authentication sequence, wherein the multi-step authentication sequence comprises a plurality of queries, wherein the plurality of queries for the multi-step authentication sequence are associated with a plurality of web pages, wherein processing the form information further comprises:
   identifying a password field on a first web page of the plurality of web pages, and
   identifying a second web page associated with the first web page of the plurality of web pages; and
   communicating a response to a portion of the multi-step authentication sequence using form information that corresponds to a query upon recognition of indicia of the portion of the plurality of web pages where the portion comprises the query, wherein the indicia comprises at least one of host URLs, target URLs, form fields, and page text, and wherein the indicia is recognized for at least part of the multi-step authentication sequence by at least one of an exact match or a fuzzy match.

2. The method of claim 1, wherein processing the form information further comprises recording the form information to be used to complete the multi-step authentication sequence.

3. The method of claim 1, further comprising repeating the communicating step for each portion of the multi-step authentication sequence until completion.

4. The method of claim 1, wherein recognition of the indicia further comprises comparing the indicia of the multi-step authentication sequence with a current web page of the plurality of web pages.

5. The method of claim 1, further comprising identifying a portion of a current web page of the plurality of web pages that does not match at least one of the indicia or the form information associated with any portion of the multi-step authentication sequence.

6. The method of claim 1, wherein the indicia of the portion of the plurality of web pages comprises at least one of an URL or layout information associated with the portion of the plurality of web pages.

7. The method of claim 1, wherein processing the form information further comprises associating the form information with a URL of any of the plurality of web pages.

8. The method of claim 1, wherein processing the form information further comprises monitoring interaction with a plurality of web forms to obtain the form information.

9. The method of claim 1, wherein communicating the response further comprises comparing at least one of indicia or form information associated with the plurality of web pages associated with the multi-step authentication sequence with a portion of a current web page to validate the portion.

10. An apparatus for automating a multi-step authentication sequence for accessing a computer resource, comprising:
   at least one processor communicatively coupled to at least one memory, wherein the at least one processor is configured to:
      process form information associated with the multi-step authentication sequence, wherein the multi-step authentication sequence comprises a plurality of queries, wherein the plurality of queries for the multi-step authentication sequence are associated with a plurality of web pages, wherein processing the form information further comprises:
identifying a password field on a first web page of the plurality of web pages, and
identifying a second web page associated with the first web page of the plurality of web pages;
identify indicia of the multi-step authentication sequence, wherein the indicia comprises at least one of host URLs, target URLs, form fields, and page text, and wherein the indicia is identified for at least part of the multi-step authentication sequence by at least one of an exact match or a fuzzy match; and
automatically answer the portion of the multi-step authentication sequence using the form information.

11. The apparatus of claim 10, wherein the at least one processor is further configured to compare indicia of the multi-step authentication sequence with a portion of a current web page.

12. The apparatus of claim 10, wherein the at least one processor is further configured to record the form information to be used to complete the multi-step authentication sequence.

13. The apparatus of claim 10, wherein the at least one processor is further configured to identify a portion of a current web page of the plurality of web pages that does not match at least one of the indicia or the form information associated with any portion of the multi-step authentication sequence.

14. The apparatus of claim 10, wherein the at least one processor is further configured to validate a portion of any of the plurality of web pages associated with the multi-step authentication sequence.

15. A system for automating a multi-step authentication sequence for accessing a computer resource, comprising:
a server comprising at least one processor communicatively coupled to a network, wherein the server is configured to:
present a multi-step authentication sequence comprising a plurality of queries, wherein the plurality of queries for the multi-step authentication sequence are associated with a plurality of web pages;
an interaction processor configured to process form information associated with the multi-step authentication sequence, wherein processing the form information further comprises:
identifying a password field on a first web page of the plurality of web pages, and
identifying a second web page associated with the first web page of the plurality of web pages; and
a client comprising at least one processor communicatively coupled to a network, wherein the client is configured to:
recognize a portion of the multi-step authentication sequence comprising indicia, wherein the indicia comprises least one of host URLs, target URLs, form fields, and page text, and wherein the indicia is recognized for at least part of the multi-step authentication sequence by at least one of an exact match or a fuzzy match, and
automatically answer the portion of the multi-step authentication sequence with a corresponding portion of the form information.

16. The system of claim 15, wherein the client is further configured to compare indicia of the multi-step authentication sequence with a portion of a current web page.

17. The system of claim 15, wherein the interaction processor is further configured to record the form information to be used to complete the multi-step authentication sequence.

18. The system of claim 15, wherein the client is further configured to compare at least one of indicia or form information associated with the plurality of web pages associated with the multi-step authentication sequence with a portion of a current web page to validate the portion.

19. The system of claim 15, wherein the interaction processor is further configured to monitor interaction with a plurality of web forms to obtain the form information.

* * * * *